United States Patent [19]

Gale

[11] 3,861,466
[45] Jan. 21, 1975

[54] OIL RECOVERY PROCESS UTILIZING AQUEOUS SOLUTION OF A MIXTURE OF ALKYL XYLENE SULFONATES

[75] Inventor: Walter W. Gale, Houston, Tex.

[73] Assignee: Exxon Production Research Company, Houston, Tex.

[22] Filed: Jan. 2, 1974

[21] Appl. No.: 430,349

[52] U.S. Cl............ 166/273, 166/274, 252/8.55 D
[51] Int. Cl............................................. E21b 43/22
[58] Field of Search..................... 166/273–275, 166/305 R, 306, 270; 252/8.55 D

[56] References Cited
UNITED STATES PATENTS

| | | | |
|---|---|---|---|
| 3,251,412 | 5/1966 | Cooke, Jr. et al.............. | 166/275 |
| 3,302,713 | 2/1967 | Ahearn et al...................... | 166/274 |
| 3,348,611 | 10/1967 | Reisberg........................ | 166/274 X |
| 3,446,282 | 5/1969 | Cooke, Jr. ...................... | 166/274 |
| 3,468,377 | 9/1969 | Dunlap et al. .................. | 166/274 |
| 3,605,891 | 9/1971 | Ayers, Jr........................ | 166/273 |
| 3,664,419 | 5/1972 | Holm ............................. | 166/274 |
| 3,799,263 | 3/1974 | Prillieux et al................. | 166/275 |

*Primary Examiner*—Stephen J. Novosad
*Attorney, Agent, or Firm*—Lewis H. Eatherton

[57] ABSTRACT

Crude oil is recovered by injecting into a subterranean formation an aqueous surfactant solution including a mixture of alkyl orthoxylene sulfonates, one sulfonate being a $C_{8-12}$ orthoxylene sulfonate with the other being a $C_{16-20}$ orthoxylene sulfonate. The preferred orthoxylene sulfonate mixture is a mixture of nonyl orthoxylene sulfonate and octadecyl orthoxylene sulfonate in a 1:1 ratio.

19 Claims, No Drawings

OIL RECOVERY PROCESS UTILIZING AQUEOUS SOLUTION OF A MIXTURE OF ALKYL XYLENE SULFONATES

BACKGROUND OF THE INVENTION

1. Field of the Invention

This invention relates to the recovery of oil from a subterranean formation; more specifically, this invention relates to recovery of oil from a subterranean formation through the employment of an aqueous surfactant solution, the surfactant comprising a mixture of a $C_{8-12}$ orthoxylene sulfonate and $C_{16-20}$ orthoxylene sulfonate.

2. Description of the Prior Art

The crude oil which is accumulated in subterranean formations is recovered or produced therefrom through one or more wells drilled into the subterranean formation with the initial production of the crude oil being caarried out by what is referred to as "primary recovery," i.e., where only initial formation energy is used to recover the crude oil. The primary recovery technique, however, leaves substantial quantities of crude oil in the subterranean formation. Accordingly, the recognition of the large amount of crude oil remaining in many oil-producing subterranean formations and reservoirs has led to the use of so-called "secondary and tertiary recovery" techniques which have as their primary purpose the economical recovery of additional quantities of oil known to be present in the subterranean formation or reservoir after primary depletion.

Probably one of the most common secondaary recovery techniques is the so-called "waterflooding" in which aqueous fluids are injected at one or more points in the reservoir at pressures sufficient to be forced out into the reservoir and toward a spaced production well or wells so as to effect a displacement of the oil from the pores of the reservoir and a driving of the oil ahead of the water front to the production well or wells.

As can be easily understood the waterflooding technique and similar secondary recovery techniques are only advantageous when the cost of the water and any additional necessary chemical modifiers is less than the value of the oil which is recovered after primary depletion. Accordingly, the displacement efficiency of the waterflood and similar techniques has been a determining factor in connection with whether such techniques can be satisfactorily utilized in oil recovery.

The displacement efficiency of the water itself is relatively poor primarily due to the formation of discontinuous oil droplets from the continuous oil as the waterflood proceeds. Furthermore, there is a relatively high interfacial tension between the water and the oil which contributes to the capillary retention of the discontinuous oil and thereby prevents its displacement by water under pressure gradients feasible in reservoir flooding processes. The displacement efficiency decreases with increasing interfacial tension thereby making recovery of oil quite difficult.

As a result of the foregoing various aqueous surfactant systems have been proposed for use in waterflooding processes for recovering oil. Thus it has been proposed that the interfacial tension between the oil and water can be reduced from a characteristic value in the order of 35 dynes per centimeter to a value of less than one dyne per centimeter with the proper selection of a surfactant or surfactants. The selection of a particular surfactant, however, depends not only upon the ability of the surfactant to reduce the interfacial tension between the oil and water but in addition the cost of the surfactant, since in any secondary or tertiary recovery technique the cost of the materials utilized must be significantly less than the value of the oil which can be recovered.

Not only are surfactants utilized in secondary recovery techniques such as waterflooding but in addition aqueous surfactant solutions are employed in tertiary recovery techniques utilized to recover residual oil from a "watered out" reservoir. In such uses a slug of an aqueous surfactant system will be introduced into the watered out reservoir followed by a driving fluid to drive the slug of aqueous surfactant through the reservoir so as to allow displacement of the residual oil trapped in the pores of the reservoir. Here again the surfactant must be selected not only based on its ability to reduce the interfacial tension between the oil and water and thus allow for effective displacement of the oil but in addition the selection of a particular surfactant which can be utilized in these tertiary recovery techniques is based upon economic considerations.

SUMMARY OF THE INVENTION

The present invention provides an improved aqueous surfactant solution which is applicable to any and all flooding techniques where aqueous surfactant solutions are conventionally employed. In this regard an improved aqueous surfactant solution is provided which allows for the effective reduction of the interfacial tension between the oil and water, allowing the recovery of the oil in an economic manner. These characteristics of the present invention are associated with the employment of a mixture of alkyl orthoxylene sulfonates, the mixture comprising one or more $C_{8-12}$ orthoxylene sulfonates in combination with one or more $C_{16-20}$ orthoxylene sulfonates.

Preferably, the present invention involves the employment of an aqueous surfactant mixture of nonyl orthoxylene sulfonate and octadecyl orthoxylene sulfonate.

Accordingly, it is a principle object of the present invention to provide an aqueous surfactant solution particularly effective for the recovery of oil in secondary and tertiary recovery techniques.

It is a further object of the present invention to provide a process for the recovery of crude oil through the utilization of a surfactant solution which includes as the surfactant a mixture of orthoxylene sulfonates.

A still further object of the present invention comprises a tertiary residual oil recovery technique comprising introducing into a watered-out reservoir a flood of an aqueous surfactant including as the surfactant a mixture of orthoxylene sulfonates, specifically, at least one $C_{8-12}$ orthoxylene sulfonate and at least one $C_{16-20}$ orthoxylene sulfonate followed by injection of a driving fluid.

Yet a further object of the present invention comprises such improved process for the secondary or tertiary crude oil recovery in which an aqueous solution of nonyl orthoxylene sulfonate and octadecyl orthoxylene sulfonate is injected into a reservoir followed by injection of a driving fluid.

Still further objects and advantages of the method of the present invention will be more apparent in the following more detailed description thereof.

DESCRIPTION OF THE PREFERRED EMBODIMENT

The foregoing objects and advantages of the present invention are achieved through the provision and utilization of an aqueous surfactant solution wherein the surfactant comprises a mixture of orthoxylene sulfonates, specifically a mixture of at least one $C_{8-12}$ orthoxylene sulfonate and at least one $C_{16-20}$ orthoxylene sulfonate, the preferred mixture of orthoxylene sulfonates comprising a mixture of nonyl orthoxylene sulfonate and octadecyl orthoxylene sulfonate. It has been discovered in accordance with the present invention that when such surfactant mixture is utilized in the recovery of oil, whether a secondary or tertiary recovery, the mixture of orthoxylene sulfonates is effective in reducing the interfacial tension between the oil and water, thereby allowing effective displacement and recovery of the crude oil within a subterranean formation, this effective displacement and recovery being achieved with minimum cost. Accordingly, the use of the specific surfactant mixture in accordance with the present invention allows for an economic secondary and/or tertiary recovery process for the recovery of crude oil from a subterranean formation.

The orthoxylene sulfonates utilized in the method of the present invention comprise a mixture of at least one $C_{8-12}$ orthoxylene sulfonate and at least one $C_{16-20}$ orthoxylene sulfonate. Typical examples of the $C_{8-12}$ orthoxylene sulfonate include octyl orthoxylene sulfonate, nonyl orthoxylene sulfonate, decyl orthoxylene sulfonate and/or dodecyl orthoxylene sulfonate, etc. Preferably, the $C_{8-12}$ orthoxylene sulfonate is a nonyl orthoxylene sulfonate, or an orthoxylene sulfonate in which the nonyl group predominates in the alkylate. Thus, for example, a typical molecular weight distribution of a nonyl orthoxylene useful in the method of the present invention is as follows:

Nonyl o-xylene

| Molecular formulae of alkylate | % appearance in alkylate |
|---|---|
| $C_{17}H_{28}$ | 98.1% |
| $C_{18}H_{30}$ | 1.9% |

The $C_{16-20}$ orthoxylene sulfonate employed in combination with the $C_{8-12}$ orthoxylene sulfonate can be selected from hexadecyl orthoxylene sulfonate, heptadecyl orthoxylene sulfonate, octadecyl orthoxylene sulfonate and/or eicosyl orthoxylene sulfonate. It is preferred in accordance with the present invention that the $C_{16-20}$ orthoxylene sulfonate be octadecyl orthoxylene sulfonate or a component which predominates in the octadecyl grouping. A typical example of the molecular weight distribution of an octadecyl orthoxylene is as follows:

Octadecyl o-xylene

| Molecular formula of alkylate | % appearance in alkylate |
|---|---|
| $C_{26}H_{46}$ | >95% |

The $C_{8-12}$ orthoxylene sulfonate and $C_{16-20}$ orthoxylene sulfonate employed in admixture in accordance with the present invention are employed in the form of salts. The salt forming cation can be any conventional cation employed in the formation of sulfonate surfactants for the recovery of crude oil including but not limited to basic metals such as sodium and other alkali and alkaline earth metals, ammonium and amine salts. Particularly preferred salt forming cations are the amine salts, particularly alkanolamine salts, including monoalkanolamine, dialkanolamine, and trialkanolamine salts wherein the alkanol group contains up to 4 carbon atoms. A particularly preferred salt forming cation is monoethanolamine, the orthoxylene sulfonates preferably being utilized in the form of monoethanolamine salts.

In accordance with the present invention the orthoxylene sulfonates can include, in addition to the sulfonate group and alkyl group, other groups which do not in any way interfere with the surface active ability of the orthoxylene sulfonate surfactant. For example, an additional alkyl group can be present on the orthoxylene sulfonate. The orthoxylene sulfonate surfactants can be prepared by techniques well known in the art. For example, orthoxylene is alkylated in the conventional manner and reacted with a sulfonating reagent to form the sulfonic acid; thereafter the sulfonic acid is reacted with a salt forming cation such as monoethanolamine to produce the desired sulfonate. All of the techniques for preparation of the alkylate, sulfonation of the same, and formation of the sulfonate salt are well known in the art and will not be exemplified further.

The aqueous surfactant solution employed in the method of the present invention is generally a brine solution containing from about 0.1 percent to about 5 percent by weight sodium chloride, preferably from about 0.1 to about 2 percent by weight sodium chloride. Of course, slightly lesser or greater amounts of the sodium chloride can be present in the aqueous surfactant solution where desired for particular purposes. Also, the aqueous surfactant solution in accordance with the present invention may contain any of the conventional water thickeners which are utilized to increase the viscosity of the aqueous solution and to reduce the mobility thereof so as to obtain a viscosity and mobility similar to that of the formation crude. Such conventional thickeners can be, for example, microbial gum polysaccharide or a partially hydrolyzed polyacrylamide sold respectively, for example, under such tradenames as "Kelzan XC" and Dow "Pusher," manufactured respectively by Kelco Corporation and Dow Chemical Company. These materials as well as other conventional thickeners or viscosity modifiers can be applied to the aqueous surfactant solution in their conventional manner.

In the aqueous surfactant solution, each of the orthoxylene sulfonates is employed in an amount such that the total surfactant system is capable of effectively displacing the crude oil within the subterranean formation toward the production means so as to allow recovery of the crude oil therethrough. Generally, however, each of the orthoxylene sulfonates is employed in an amount of from about 0.05 percent to about 10 percent by weight with the weight ratio of $C_{8-12}$ orthoxylene sulfonate to the $C_{16-20}$ orthoxylene sulfonate varying from about 4:1 to about 1:4. Preferably, the $C_{8-12}$ orthoxylene sulfonate and $C_{16-20}$ orthoxylene sulfonate are employed in a weight ratio of about 1:1. This produces the maximum recovery of the crude oil with the lowest interfacial tension between the surfactant solution and formation crude.

The aqueous surfactant solution employed in accordance with the present invention is generally utilized in an amount of 0.03 to 1 pore volumes. Preferably the concentration of the surfactant system and the pore volume of the aqueous solution are so adjusted that the concentration of the surfactant times the percentage of the pore volume bank does not exceed a value of 100. Of course, slight deviations from this can be tolerated and are within the scope of the present invention, being utilized where desired for particular purposes.

The aqueous surfactant solution utilized in the method of the present invention is particularly adapted for the recovery of residual oil from a watered out reservoir, i.e., the reservoir which has been subjected to primary depletion and secondary waterflooding. Under such circumstances the aqueous surfactant solution is preferably introduced into the subterranean formation in the form of a slug or bank, generally a 0.03 to 0.6 pore volume slug of the aqueous brine containing the mixture of orthoxylene sulfonates with the optional presence of a thickener or viscosity modifier as described above. The slug is driven through the formation by means of a driving fluid and displaces the crude oil which is trapped in the formation toward a production well or wells. Generally, the slug is introduced through one or more injection wells placed apart from but in fluid communication with one or more production wells although the process of the present invention also finds applicability in those instances where a single well serves both for injection and production through the so-called "push-pull" technique. The driving fluids which drive the aqueous slug through the formation may be any typically utilized driving fluid such as thickened water or thickened brine, the driving fluid generally being one which has a viscosity and mobility similar to the slug driven through the formation. Likewise, it is conventional to control the viscosity and mobility of the slug so as to eliminate any adverse fingering effect when driving the slug through the formation. As was the case with regard to the thickeners or viscosity modifiers utilized in the aqueous surfactant solution, any conventionally employed thickeners or viscosity modifiers can be utilized in the production of thickened water or brine driving fluid.

In addition to employing the aqueous surfactant solution as a slug subsequent to primary depletion and waterflooding, the aqueous surfactant solution containing the mixture of orthoxylene sulfonates of the present invention can be applicably employed in a waterflood technique. Here again the mixture of orthoxylene sulfonates acts to reduce the interfacial tension between the oil and water, thereby allowing for a more efficient displacement of the oil through the subterranean formation toward the production well and a more efficient recovery of oil. Since the mixture of orthoxylene sulfonates utilized in the method of the present invention effectively reduces the interfacial tension at low cost, the process of the present invention can be carried out efficiently.

The method of the present invention will now be described by reference to the following example, it being understood that such example is presented for purposes of illustration only and the present invention is in no way to be deemed limited thereby.

EXAMPLE

Berea cores ½ inch × ½ inch × 1 foot long containing Loudon oil (from the Loudon field, Illinois) at its waterflood residual saturation were utilized to determine the effectiveness of the aqueous surfactant solution of the present invention for reducing the residual oil saturation. The surfactant solution which was employed was a solution of 0.5 percent of nonyl orthoxylene sulfonate (monoethanolamine salt) and 0.5 percent of octadecyl orthoxylene sulfonate (monoethanolamine salt) in 2 percent NaCl. The monoethanolamine salts of both sulfonates were injected for 1 PV and were followed by the injection of brine. As a result of such flooding, a final oil saturation of Loudon oil of 6.0 percent was achieved illustrating the effectiveness of the surfactant system to displace and recover residual crude oil.

While the present invention has been described primarily with regard to the foregoing specific exemplification, it should be understood that the present invention cannot under any circumstances be deemed as limited thereto but rather must be construed as broadly as all or any equivalents thereof.

What is claimed is:

1. In a method of recovering crude oil from a subterranean formation wherein an aqueous surfactant solution is injected into the formation through at least one injection means to displace crude oil toward at least one production means, the improvement wherein said aqueous surfactant solution includes as the surfactant a mixture of at least one $C_{8-12}$ o-xylene sulfonate and at least one $C_{16-20}$ o-xylene sulfonate.

2. The method of claim 1 wherein said $C_{8-12}$ o-xylene sulfonate and $C_{16-20}$ o-xylene sulfonate are in a weight ratio of 4:1 to 1:4.

3. The method of claim 1 wherein said aqueous surfactant solution is injected into the subterranean formation subsequent to primary depletion and waterflooding.

4. The method of claim 3 wherein said aqeuous surfactant solution is injected as a 0.03 to 0.6 PV slug followed by injection of a driving fluid.

5. The method of claim 1 wherein said $C_{8-12}$ o-xylene sulfonate is nonyl o-xylene sulfonate and said $C_{16-20}$ o-xylene sulfonate is octadecyl o-xylene sulfonate.

6. The method of claim 5 wherein said nonyl o-xylene sulfonate and octadecyl o-xylene sulfonate are present in a 1:1 weight ratio.

7. The method of claim 5 wherein each of said nonyl o-xylene sulfonate and octadecyl o-xylene sulfonate is present in said aqueous surfactant solution in an amount of about 0.5 to about 10 percent by weight.

8. The method of claim 5 wherein said nonyl o-xylene sulfonate and octadecyl o-xylene sulfonate are in the form of monoethanolamine salts.

9. A method of recovering residual crude oil from a subterranean formation which has been subjected to primary depletion and waterflooding which comprises injecting into the watered out formation a slug of an aqueous surfactant solution including (a) at least one $C_{8-12}$ o-xylene sulfonate and (b) at least one $C_{16-20}$ o-xylene sulfonate, the weight ratio of (a) to (b) being 4:1 to 1:4, (a) + (b) being employed in an amount effective to displace and recover residual crude oil from said formation, and thereafter injecting into said formation a driving fluid to drive said aqueous surfactant solution through the formation.

10. The method of claim 9 wherein said slug of an aqueous surfactant solution is a 0.03 to 0.6 PV slug.

11. The method of claim 9 wherein said $C_{8-12}$ o-xylene sulfonate is nonyl o-xylene sulfonate and said $C_{16-20}$ o-xylene sulfonate is octadecyl o-xylene sulfonate.

12. The method of claim 11 wherein said nonyl o-xylene sulfonate and octadecyl o-xylene sulfonate are present in a 1:1 ratio.

13. The method of claim 11 wherein each of said nonyl o-xylene sulfonate and octadecyl o-xylene sulfonate is present in said aqueous surfactant solution in an amount of about 0.5 to about 10 percent by weight.

14. The method of claim 11 wherein said nonyl o-xylene sulfonate and octadecyl o-xylene sulfonate are in the form of monoethanolamine salts.

15. A method of recovering crude oil from a subterranean formation which comprises injecting into said formation through at least one injection means in communication with at least one production means an aqueous surfactant solution including (a) nonyl o-xylene sulfonate and (b) octadecyl o-xylene sulfonate, the weight ratio of (a) to (b) being 4:1 to 1:4, (a) + (b) being employed in an amount effective to displace crude oil in said formation toward said production means and recovering the displaced crude oil through said production means.

16. The method of claim 15 wherein said aqueous surfactant solution is injected into the subterranean formation subsequent to primary depletion and waterflooding.

17. The method of claim 15 wherein said aqueous surfactant solution is injected as a 0.03 to 0.6 PV slug followed by injection of a driving fluid.

18. The method of claim 15 wherein each of said nonyl o-xylene sulfonate and octadecyl o-xylene sulfonate is present in said aqueous surfactant solution in an amount of about 0.5 to about 10 percent by weight.

19. The method of claim 15 wherein said nonyl o-xylene sulfonate and octadecyl o-xylene sulfonate are in the form of monoethanolamine salts.

* * * * *